US012610887B2

(12) United States Patent
Schade et al.

(10) Patent No.: US 12,610,887 B2
(45) Date of Patent: Apr. 28, 2026

(54) METHOD, APPARATUS AND SYSTEM FOR MEASURING A GRAIN ON A HARVESTING MACHINE

(71) Applicant: DEERE & COMPANY, Moline, IL (US)

(72) Inventors: Peter Schade, Bad Dürkheim (DE); Ambarish Panambilly, Kaiserslautern (DE); Carsten Struve, Ladenburg (DE); Renke F. Gralfs, Trippstadt (DE)

(73) Assignee: Deere & Company, Moline, IL (US)

( * ) Notice: Subject to any disclaimer, the term of this patent is extended or adjusted under 35 U.S.C. 154(b) by 345 days.

(21) Appl. No.: 18/165,383

(22) Filed: Feb. 7, 2023

(65) Prior Publication Data
US 2023/0345875 A1 Nov. 2, 2023

(30) Foreign Application Priority Data
Apr. 27, 2022 (DE) .......................... 102022110185.1

(51) Int. Cl.
| *A01D 41/12* | (2006.01) |
| *A01D 41/127* | (2006.01) |
| *G01N 21/85* | (2006.01) |

(52) U.S. Cl.
CPC ..... *A01D 41/1277* (2013.01); *A01D 41/1272* (2013.01); *G01N 21/85* (2013.01); *G01N 2021/8592* (2013.01)

(58) Field of Classification Search
USPC ........................................................ 701/50
See application file for complete search history.

(56) References Cited

U.S. PATENT DOCUMENTS

| 6,285,198 | B1 | 9/2001 | Nelson et al. | |
| 2017/0024876 | A1* | 1/2017 | Young | G06Q 50/02 |
| 2021/0088691 | A1* | 3/2021 | Ferren | G06T 7/0004 |

FOREIGN PATENT DOCUMENTS

| CN | 110132384 | A | 8/2019 |
| DE | DD157483 | A1 | 11/1982 |
| DE | 3420800 | A1 | 1/1985 |
| DE | DD277756 | A1 | 4/1990 |
| DE | 29709234 | U1 | 11/1997 |
| DE | 19645068 | C1 | 4/1998 |
| DE | 102004063769 | A1 | 7/2006 |
| DE | 102020118160 | A1 | 1/2021 |
| DE | 102021126421 | A1 | 5/2022 |
| EP | 0908086 | A1 | 4/1999 |
| EP | 0967495 | A2 | 12/1999 |

(Continued)

OTHER PUBLICATIONS

W. Wu et al., GainTKW: A Measurement System of Thousand Kernel Weight Based on the Android Platform, Agronomy 2018, Sep. 10, 2018, pp. 1-15, doi:10.3390/agronomy8090178.

*Primary Examiner* — Adam D Tissot
(74) *Attorney, Agent, or Firm* — Hanley, Flight & Zimmerman, LLC

(57) ABSTRACT

A method for measuring grain on a harvesting machine for harvesting cereals comprising: acquiring an image of the grain in the harvesting machine using a camera; and processing the image in an image processing system and generating an output value in respect of properties of the grain, wherein the output value contains information relating to at least one of the following quantities per unit area of the field: grain count, grain dimensions, and grain mass.

20 Claims, 4 Drawing Sheets

(56)　　　　　　References Cited

FOREIGN PATENT DOCUMENTS

| | | | |
|---|---|---|---|
| EP | 1516522 | A2 | 3/2005 |
| EP | 1956361 | A2 | 8/2008 |
| EP | 2057882 | A2 | 5/2009 |
| EP | 2189781 | A2 | 5/2010 |
| EP | 2570968 | A2 | 3/2013 |
| EP | 2742791 | A2 | 6/2014 |
| EP | 3008990 | A2 | 4/2016 |
| EP | 3038054 | A2 | 6/2016 |
| EP | 3366104 | A1 * | 8/2018 ........... A01B 79/005 |
| EP | 3901588 | A1 | 10/2021 |
| WO | WO1986005353 | A1 | 9/1986 |
| WO | WO2018073093 | A1 | 4/2018 |
| WO | WO2018073163 | A1 | 4/2018 |

* cited by examiner

TKM = -0.8128x + 64.79

$R^2 = 0.963$

Number of Grains
in an Image

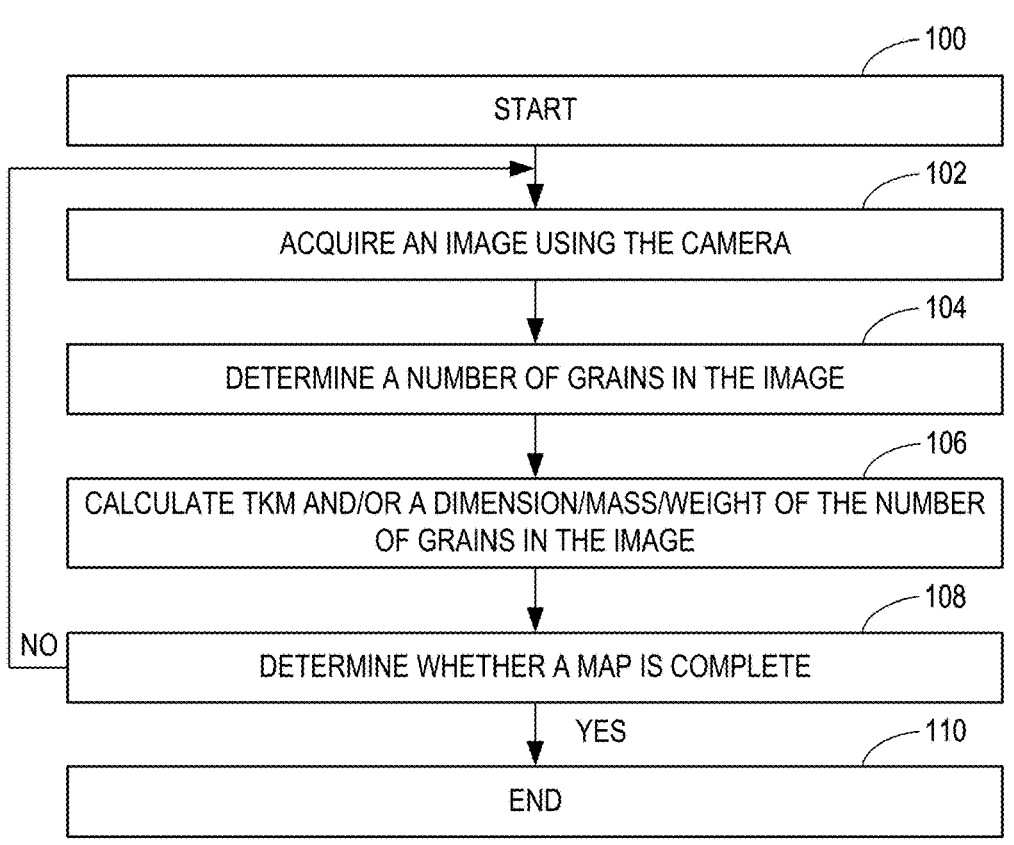

FIG. 6

100 — START

102 — ACQUIRE AN IMAGE USING THE CAMERA

104 — DETERMINE A NUMBER OF GRAINS IN THE IMAGE

106 — CALCULATE TKM AND/OR A DIMENSION/MASS/WEIGHT OF THE NUMBER OF GRAINS IN THE IMAGE

108 — DETERMINE WHETHER A MAP IS COMPLETE

NO

YES

110 — END

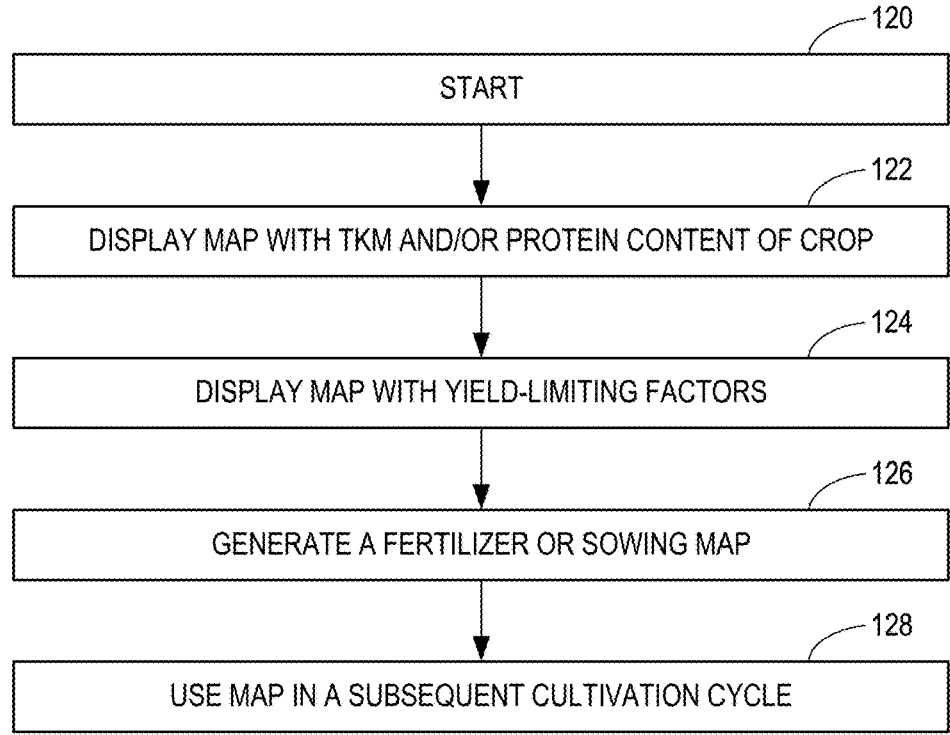

FIG. 7

120 — START

122 — DISPLAY MAP WITH TKM AND/OR PROTEIN CONTENT OF CROP

124 — DISPLAY MAP WITH YIELD-LIMITING FACTORS

126 — GENERATE A FERTILIZER OR SOWING MAP

128 — USE MAP IN A SUBSEQUENT CULTIVATION CYCLE

METHOD, APPARATUS AND SYSTEM FOR MEASURING A GRAIN ON A HARVESTING MACHINE

RELATED APPLICATIONS

This document claims priority based on German Patent Application No. 102022110185.1, filed on Apr. 27, 2022, which is hereby incorporated by reference into this application.

FIELD OF THE DISCLOSURE

The present disclosure relates to a method, apparatus and system for measuring grain on a harvesting machine for harvesting cereals.

BACKGROUND

Modern precision agriculture endeavors to use the available resources such as water, soil and fertilizer optimally in order to exploit the yield potentials as much as possible with minimal consumption of resources. In this case, during the harvest, yield maps are commonly generated by suitable measuring devices with simultaneous position determination, in order for example to vary amounts of fertilizer and sowing rates location-specifically on the basis thereof with the aid of the yields (WIPO Patent Appl. No. WO 86/05353 A1). A refinement of the planning of subsequent precision agriculture measures is made possible by measuring protein contents of the crop (European Patent Appl. No. EP 2 189 781 A2).

Although the previous procedures measure the yields and optionally constituents of the crop in relation to location, one substantial aspect remains ignored in the harvesting of cereals such as corn or maize, namely the dimensions or mass of the individual grains, which is usually measured as a so-called thousand kernel mass (or thousand kernel weight), or the number of grains per unit area of the field. For locations in which the yield has been measured, the mass of the grains (in what follows, a plurality of grains is also referred to as "the grain") per unit area of the field, may be calculated by multiplying the number of grains per unit area by the thousand kernel mass (divided by 1000). The thousand kernel mass is conventionally measured by counting 1000 grains and measuring their mass (as an alternative thereto, the volume of 1000 grains could be multiplied by their mass density (mass per volume)). If any two of the agronomic quantities: yield, mass (or thousand kernel mass or volume and density of the individual grains) of the individual grains and number of grains per area are known, the third agronomic quantity can be calculated. To date, however, only a measurement of the yield has been provided.

The grain size or thousand kernel mass on the one hand, and the number of grains per unit area on the other hand, contain important information for the farmer, since for example a high thousand kernel mass or relatively large grains with a low yield may indicate that the yields could be increased with a higher sowing rate because more resources than are used are available at the relevant site, while relatively low thousand kernel masses or relatively small grains indicate excessive sowing rates because fewer resources than are needed in order actually to mature all grains potentially coming to maturity are available at the relevant site.

SUMMARY

A method for measuring grain on a harvesting machine for harvesting cereals comprising: acquiring an image of the grain in the harvesting machine using a camera; and processing the image in an image processing system and generating an output value in respect of properties of the grain, wherein the output value contains information relating to at least one of the following quantities per unit area of the field: grain count, grain dimensions, and grain mass.

An apparatus for measuring grain within a crop flow on a harvesting machine for harvesting cereals comprising: a camera for acquiring an image of the crop flow; and an image processing system for processing the image and generating an output value relating to properties of the crop flow, wherein the output value contains information in relating to on a per unit area of the field basis at least one of grain count, grain dimensions, and grain mass.

A system for measuring grain within a crop flow on a harvesting machine for harvesting cereals comprising: a camera for acquiring an image of the crop flow; and an image processing system for processing the image and generating an output value relating to properties of the crop flow, wherein the output value contains information in relating to on a per unit area of the field basis at least one of grain count, grain dimensions, and grain mass.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

FIG. 6 shows a flowchart of the mapping of the thousand kernel mass; and

FIG. 7 shows a flowchart of the evaluation and further processing of the map generated by the procedure according to FIG. 6.

DETAILED DESCRIPTION

Figure 1:
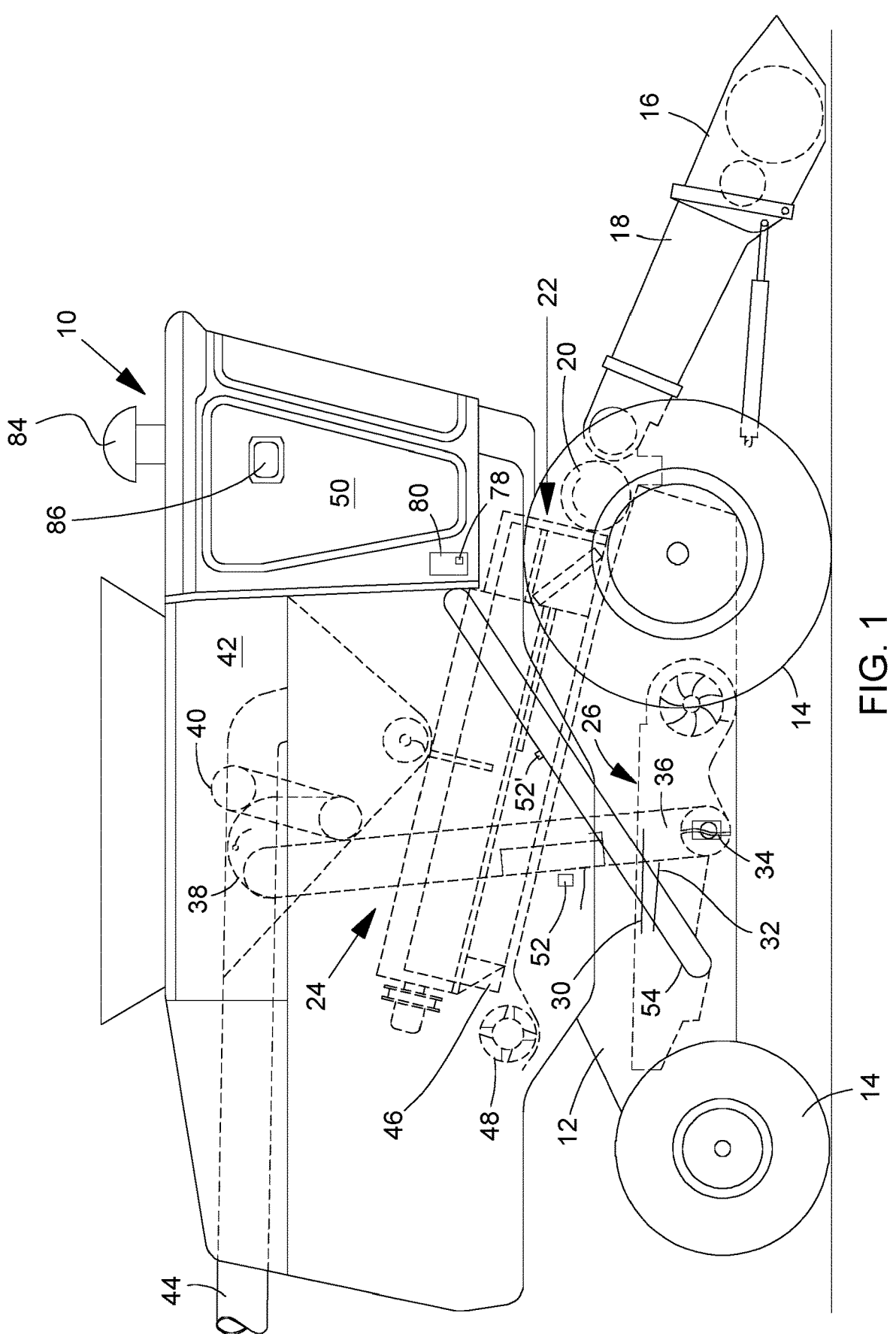
FIG. 1 is a side view of a harvesting machine.

The present disclosure relates to a system, method and apparatus for measuring a grain-specific size on a harvesting machine for harvesting cereals, having the following steps: acquiring an image of crop in the harvesting machine using a camera, and processing the image in an image processing system and generating an output value in respect of properties of the crop.

In one example, images of the crop are acquired by means of the camera, grains contained therein are identified and a quantity is ascertained which represents one or more of the aforementioned quantities or at least contains information with the aid of which the quantity may be calculated, optionally by using other parameters. The output value contains and/or represents information in respect of at least one of the following agronomic quantities: number of grains per unit area of the field, dimensioning of the grains and/or mass of the grains. In particular, the output value may be generated with the aid of the number of grains in the image or with the aid of their dimensions ascertained with the aid of the image, for example their length and/or diameter and/or their volume (calculated from the length and diameter). With the aid of the volume and a known or measured mass density of the grains, their mass or weight may be calculated.

For agronomists, in particular the thousand kernel mass (that is to say the mass of 1000 grains measured in g or kg) is of interest. With a known imaging scale, the dimensions of the grains may be derived directly from the image. Alternatively or in addition, it is possible to ascertain the number of grains in the image, which (with a known or predetermined filling level of the crop in the image and a known or predetermined contaminant fraction) may likewise be converted into the dimensions of the grains or, by using a calibration curve, directly into the thousand kernel mass. The number of grains per unit area may be measured by counting the harvested grains or a representative sample thereof by means of the image processing, or it may be computed with the aid of the separately measured yield and the number, dimensions or mass of the grains ascertained— as described—by image processing.

For example, the thousand kernel mass for the purposes of quantitative lost grain or tailings display for a combine harvester has been assumed to be constant (e.g., European Patent Appl. No. EP 1 516 522 A2 and German Patent Appl. No. DE 34 20 800 A1) and optionally counted before the harvest. Furthermore, detection of the grain dimensions by means of a camera and image processing for yield prediction of plants growing on a field (e.g., WIPO Patent Appl. No. WO 2018/073163 A1 and WIPO Patent Appl. No. WO 2018/073093 A1) or for lost grains (European Patent Appl. No. EP 2 742 791 A2) as well as optical detection of harvested grains and evaluation in order to determine the thousand kernel mass under laboratory conditions (e.g., German Democratic Republic Patent Appl. No. DD 277 756 A1; German Democratic Republic Patent Appl. No. DD 157 483 A1; German Patent Appl. No. DE 297 09 234 U1; German Patent Appl. No. DE 196 45 068 C1; Chinese Patent Appl. No. CN 110132384 A; and W. Wu et al., GainTKW: A Measurement System of Thousand Kernel Weight Based on the Android Platform, Agronomy 2018, 8, 178).

In combine harvesters, cameras may be used with image processing systems, which are used inter alia to ascertain the fractions of damaged grains and impurities in the crop that is conveyed in a tailings conveyor or grain elevator, in order to adapt the settings of operating parameters of the combine harvester when necessary (e.g., German Patent Appl. No. DE 10 2004 063 769 A1; European Patent Appl. No. EP 2 057 882 A2; European Patent Appl. No. EP 2 570 968 A2; German Patent Appl. No. DE 10 2020 118 160 A1; and European Patent Appl. No. EP 3 038 054 A2). These image processing systems are at least in part capable of detecting the place, the numbers and the dimensions of the grains in the respectively detected image, for example in order to identify damaged grain or to determine relative fractions of damaged grain or impurities in the crop flow, although these dimensions or numbers are not further evaluated and stored for agronomic purposes, let alone has a thousand kernel mass been determined or even mapped. However, these systems are generally unsuitable for generating a map in which one or more of said agronomic quantities (number of grains per unit area of the field, dimensions of the grains, thousand kernel mass) or other information, from which one or more of said quantities could be derived, is entered location-specific.

In particular, the output value is ascertained progressively on respectively different crop (that is to say, so to speak, a video film of the crop flow in the harvesting machine is taken and evaluated) and is recorded with geo-referencing in a map. Additionally, at least one constituent of the crop may be measured and stored with geo-referencing together with the output value in the map. Similarly, the yield may be measured specifically for each partial area and stored with geo-referencing together with the output value in the map. The map may be used for planning agronomic measures. In this case, the measure may be planned on the basis of the number of grains per unit area and/or their dimensions and/or their mass. In this case, the number of grains per unit area and/or their dimensions and/or their mass may be determined by using and/or read out from the map. In particular, the sowing rate may be planned on the basis of the number of grains per unit area and/or their dimensions and/or their mass.

Reference will now be made to FIG. 1, which shows an agricultural harvesting machine in the form of a combine harvester 10, which comprises a chassis 12 with driven front and steerable rear wheels 14 in contact with the ground, which support the chassis 12 for forward movement over a field to be harvested. Although wheels 14 are shown, the combine harvester 10 may be supported entirely or partially on caterpillar tracks in contact with the ground. The driving of the front wheels 14 is carried out through a conventional hydrostatic transmission by an internal combustion engine fastened on the chassis 12. In what follows, direction indications (such as forward) refer to the forward direction of the combine harvester 10, which extends to the right in FIG. 1.

A height-adjustable harvesting attachment in the form of a cutting mechanism 16 is used in order to harvest the crop and deliver it to a feeder house 18. The feeder house 18 is hinged pivotably on the chassis 12 and comprises a feeder for delivering the incoming crop to a guide drum 20. The guide drum 20 feeds the crop through an inlet transfer section 22 upward to a rotating threshing and separating assembly 24. Other orientations and types of threshing structures and other types of harvesting attachments 16, such as a transversely extending frame which supports individual row units, may also be used.

During the harvesting operation, the rotating threshing and separating assembly 24 threshes and separates the crop. Grain and chaff fall through grids at the bottom of the threshing and separating assembly 24 into a winnowing system 26. The winnowing system 26 comprises a fan 28, an upper sieve 30 and a lower sieve 32, which separate the chaff. The clean grain is collected over the width of the winnowing system 26 by a transverse feed screw 34, which delivers it to an elevator 36 for clean grain. The elevator 36 comprises chains and paddles, and feeds the clean grain into a transfer section 38, from which it is fed into a grain tank 42 by a grain tank filling screw 40. The clean grain in the grain tank 42 can be overloaded by an unloading screw feeder 44 onto a grain wagon or truck. Tailings from the rear end of the lower sieve 32 are returned by a tailings elevator 54 to the rotating threshing and separating assembly 24.

Threshed and separated straw is transferred from the rotating threshing and separating assembly 24 through an outlet 46 to a discharge feeder 48. The discharge feeder 48 in turn ejects the straw at the rear side of the combine harvester 10. It should be noted that the discharge feeder 48 could deliver the material other than grain directly to a straw chopper. The operation of the combine harvester 10 is controlled from an operator cab 50.

For the optical inspection of the crop, an image acquisition system 52 is provided. It may be arranged on the upgoing side of the elevator 36 and monitor the flow of the grain into the grain tank 42 there, and/or it may be positioned as an image acquisition system 52' at the tailings elevator 54 and may monitor the flow of crop tailings there. It would also be conceivable to fit an image acquisition system (not shown) at a measurement chamber which is continuously or discontinuously filled with the crop and then emptied again (e.g., U.S. Pat. No. 6,285,198 B1 or European Patent Appl. No. EP 0 908 086 A1. The image acquisition system 52 is used for mapping properties of the crop, although it may also be used in a manner known per se for the assessment and adjustment, based thereon, of operating parameters of the threshing, separating and winnowing processes of the combine harvester 10.

Figure 2:
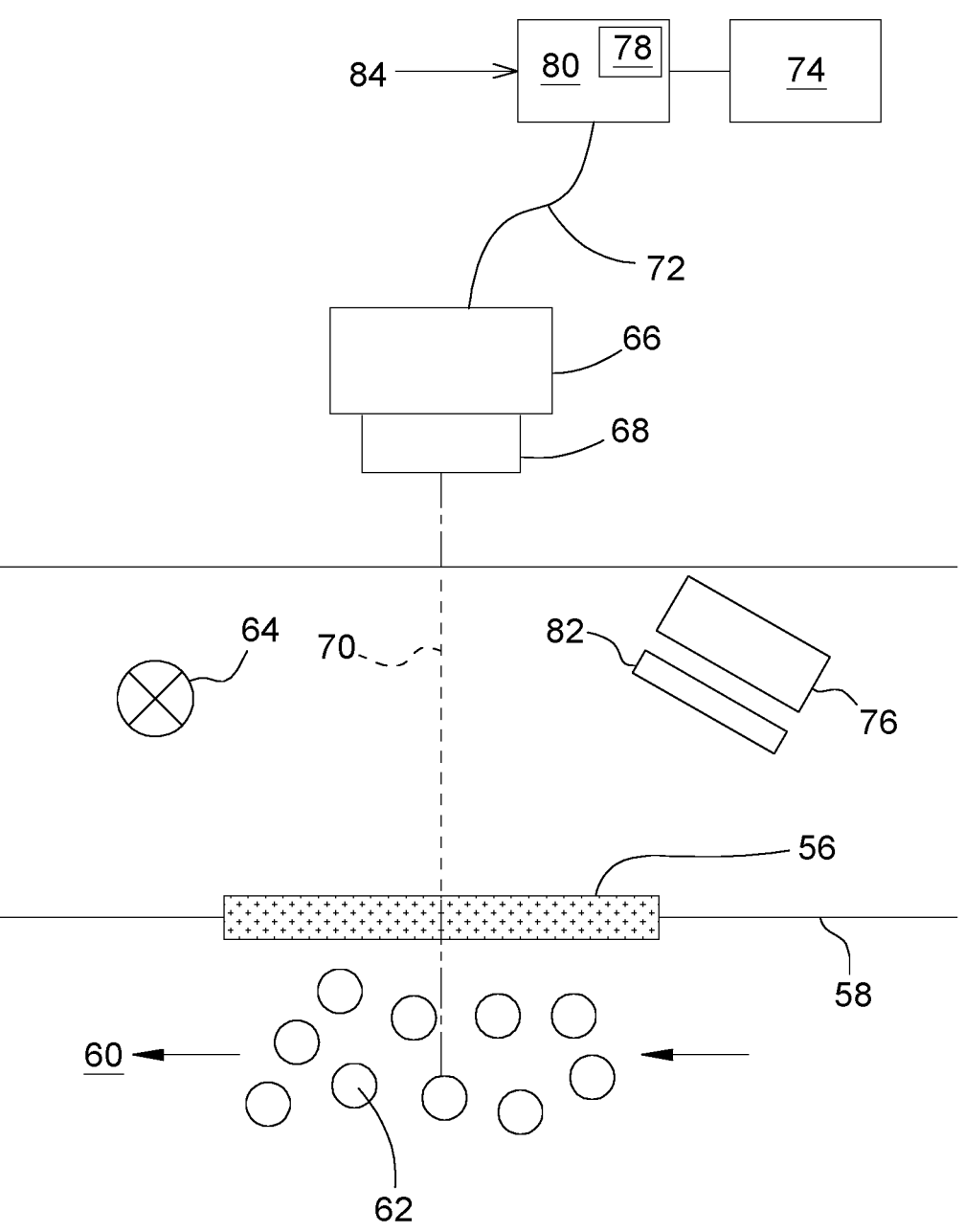
FIG. 2 is a schematic view of the physical structure of an imaging system.

The image acquisition system 52 shown in FIG. 2 comprises a window 56 transparent to visible light, which is fitted into a wall 58 of the channel 60 conveying the crop 62, which in this case is the elevator 36 or the tailings elevator 54. The window 56 is provided on one or both sides with a treatment layer in order to avoid undesired reflections. The crop 62 is illuminated by one or more light source(s) 64, which are arranged offset from the optical axis 70 of the window 56 and at an angle with respect to the optical axis 70. The light source 64 may be configured as an incandescent lamp, flash lamp, ring flash lamp, or preferably as a light-emitting diode. An objective lens 68 of a camera 66 is arranged on the optical axis 70 of the window 56 and looks through the window 56 at the crop 62 in the channel 60. An optional near-infrared sensor having a dispersive element 82 and a detector array 76 may be used to analyze constituents of the crop 62 (although this requires a light source 64 with a more or less continuous spectrum). In a different way than is shown, the image acquisition system 52 could also comprise two light sources 64, one each of which is respectively allocated to the camera 66 and to the near-infrared sensor (see European Patent Appl. No. EP 1 956 361 A2), or the near-infrared sensor may be omitted.

The camera 66 has a digital output, which is connected by means of a cable 72 (or wirelessly or via an optical connection) to an electronic control device 80 that comprises an image processing system 78 and is connected to a storage device 74. During operation, the camera 66 continuously acquires images of the crop 62, and these are analyzed by the image processing system 78. The output values of the image processing system 78 are forwarded directly or via the control device 80 to the storage device 74, in which a map in which the output values are stored with geo-referencing is stored by using signals of a position determination system 84.

The position determination system 84 comprises an antenna for receiving signals from satellites of a global navigation system (GNSS), such as GPS or Galileo, and optionally local or global differential signals (DGPS or RTK), and calculates the current position of the harvesting machine 10. The output values of the image processing system 78 are then stored location-specifically in the map in the storage device 74, so that they are subsequently available for further evaluation and planning. They may also be transmitted online to a remote place, for example to a portable or static computer of the farmer whose field is being processed. The output values and/or the map may also be displayed on a display device 86 in the cabin 50.

The present disclosure is based on ascertaining, by the image processing system 78 with the aid of the image signals of the camera 66, a quantity which is dependent on the dimensions of the grains in the crop and therefore contains information relating thereto (in particular the thousand kernel mass of the grains contained in the crop and/or their volume) and entering it as an output signal of the image processing system 78 into the map in the storage device 78. Specifically, the quantity (dimensions, that is to say length and diameter and volume) of the grains and therefore the mass measured in kg or g, or the weight measured in N (newtons) of the individual grains, varies not only as a function of the nature of the crop but also as a function of the respective site, since the grains will be location-dependently large or smaller depending on the supply of water, light, soil properties, stand density, fertilizer, etc. Furthermore, more or fewer plants with more or fewer grains thereon grow as a function of the local conditions. The yield, which may be calculated from the product of the number of grains per unit area times their respective mass, therefore also varies. For agronomic purposes, it is therefore beneficial to obtain a map in respect of a quantity dependent on the dimensions of the grains, or mass of the grains and/or number of grains per unit area, on the basis of which the chronologically subsequent measures may be planned location-specifically. The aforementioned quantity is in particular the thousand kernel mass, which represents a conventional agronomic quantity (and/or a quantity dependent on the dimensions of the grains, such as volume and/or length and/or diameter) and/or the number of grains per unit area.

Figures 3, 4:
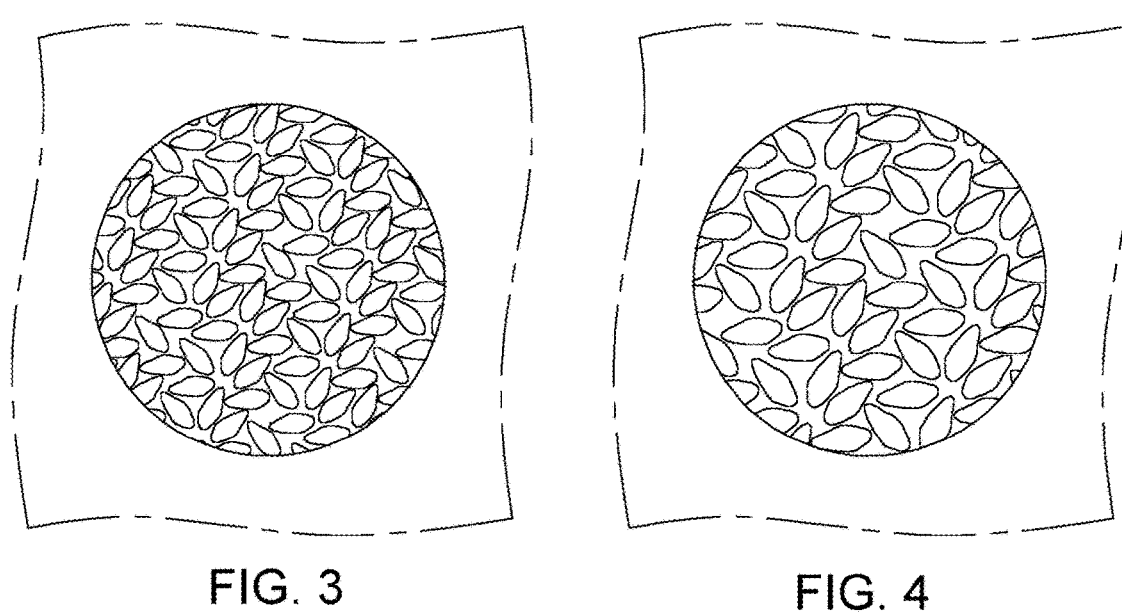
FIGS. 3 and 4 show examples of camera images.

Typical images of the camera 66 assigned to the image acquisition system 52 (positioned at the elevator 36), which therefore show the grains contained in the elevator 36, are represented in FIG. 3 (with relatively small grains) and in FIG. 4 (with relatively large grains).

FIG. 6 shows a possible procedure of the control device 80. After the start in step 100, in step 102 an image signal is acquired by the camera 66, as is represented by way of example in FIGS. 3 and 4. In the next step 104, the image processing system 78 determines the number of grains in the image. For this purpose, algorithms known per se that acquire the edges of the individual grains and therefore identify individual grains may be employed. The total number of grains in the image may be ascertained by adding up the detected grains. For this purpose, for example, reference is made to the procedure disclosed in European Patent Appl. No. EP 2 057 882 A2, the disclosure of which is incorporated into the present document by reference.

It should be noted that it may be assumed that the entire image detected by the camera is filled with grains. In the event of a non-negligible fraction of contaminants in the image, or voids contained therein in the event of a partially filled image window, a corresponding adaptation would be necessary. For example, multiplying the total number of grains by a factor of $1/(1-(\text{contaminant and/or void fraction}))$. Although the images of the camera 66—due to the dimensions of the grains with a given filling level of the image window detected by the camera 66—show different numbers of grains, direct information relating to the number of grains (harvested per unit area) cannot be obtained. This is because the camera 66 does not detect all of the grain conveyed in the elevator 36, but only ever a representative section thereof, as far as possible independently of the respective throughput. This number of grains harvested per unit area, although fundamentally of interest agronomically, may however be derived from other measured and mapped quantities, as described below (that is to say in particular by dividing the yield by the thousand kernel mass). It could, however, also be detected directly, for example by detecting an image of the grain from an elevator paddle with the camera 66, that is to say for example by replacing a photoelectric barrier already provided there in the prior art with the camera (see European Patent Appl. No. EP 0 967 495 A2) and counting or calculating the number of grains on the paddle and converting back to the associated harvested area, and entering the aforementioned number per area into the map with geo-referencing. The dimensioning of the grains may also be determined with the aid of the image.

Figure 5:
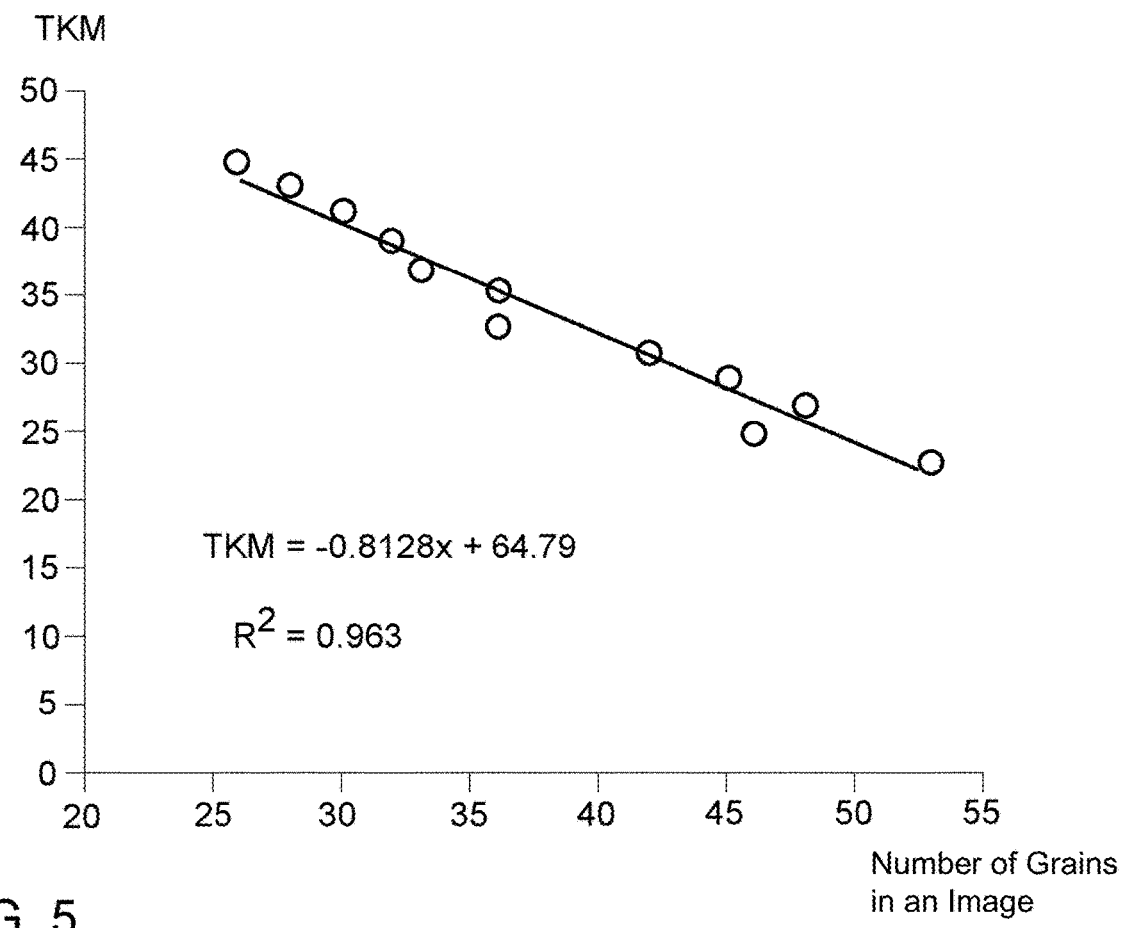
FIG. 5 shows a diagram in which the thousand kernel mass is represented by way of example as a function of the number of grains contained in the camera image.

In the next step 106, the thousand kernel mass (TKM) or any other quantity representative of the dimensions or mass or the weight of the grains or number of grains per unit area harvested is ascertained. For this purpose, reference may be made to the diagram of FIG. 5, for example, in which the relationship between the number of grains in the image and the thousand kernel mass is plotted for a particular type of crop. The thousand kernel mass is ascertained in this example with the aid of a simple regression line. The latter may be determined by calibration trials and programmed in the control device 80, the respective regression line dependent on the type or sort of crop being selected with the aid of a user input for selecting the type of crop (which is also used for adjusting the operating parameters of the harvesting machine 10) or automatic detection of the crop. In a refined embodiment, the mass density of the grains may also be ascertained by weighing and volume measurement or other physical measurement methods (for example capacitively), and the mass of the grains may therefore be determined with the aid of the (individual or average) volume of the grains ascertained by the image processing system 78. Finally, an average thousand kernel mass (or any other desired quantity representative of the dimensions or mass or the weight of the grains) is ascertained for the acquired image in step 106 and stored location-specifically in the storage device 74.

It is to be noted that the dimensions (length, diameter) of the grains may, in another variant, be ascertained with the aid of the image of the camera 66. For this purpose, by a suitable algorithm, the pixel numbers respectively to be assigned to a grain in the image of the camera are to be ascertained by the image processing system (in particular for the longitudinal and transverse axes of the individual grain) and multiplied by a scaling factor. These dimensions, or a volume derived therefrom, may be entered into the map as an alternative or in addition to the thousand kernel mass, in particular as average values for the respective image. The number of grains per unit area may be calculated with the aid of the yield, as described below.

In step 106, referencing of the image or of the ascertained quantity may be carried out in a manner known per se to the site on which the grains are grown (cf., European Patent Appl. No. EP 3 008 990 A2), that is to say the travel time of the crop between harvesting and sensing, and the path of the harvesting machine 10 or position determination device 84 travelled in between, may be compensated for. Furthermore, the yield (in volume or mass per unit area) may be measured, for example by means of an impact plate sensor 88 (see European Patent Appl. No. EP 3 901 588 A1 and the prior art cited therein) and mapped, and a measured volume may be converted into a mass with the aid of a measured or known density. In step 108, a query is made as to whether the map is complete. If this is not the case, step 102 is carried out again, otherwise the method is ended in step 110.

FIG. 7 shows a procedure for use of the map generated with the method according to FIG. 6. After the start in step 120, in step 122 the map is retrieved on any desired computer, that is to say loaded into its memory. The computer may be a stationary computer, which is located in the office of the farmer or of an authorized agronomist, whose field has been harvested with the harvesting machine 10 according to the procedure of FIG. 6, or the farmer or authorized agronomist uses a mobile computer (laptop, tablet, smartphone, etc.). The map may also be displayed two-dimensionally on a display device in step 122, different thousand kernel masses (or any other desired quantity representative of the dimensions or mass or the weight of the grains or their number per area) being displayed by colors or in another way (grayscales, shading, etc.). One or more constituent contents of the crop, which have been measured with the near-infrared sensor shown in FIG. 2 and mapped location-specifically, may also be entered into the map. These one or more constituent contents, for example the protein content of the crop, may likewise be displayed. Similarly, it is possible to work with one or more other properties of the field, for example the type of soil, or fertilizer applications varying location-specifically or constant over the field, or measured nutrients in the soil, or the yield (in grains or mass per area) or number of plants respectively sowed per unit area.

In step 124, yield-limiting factors may be ascertained and displayed by using the aforementioned map, and in particular the location-specifically recorded thousand kernel masses or any one or more desired other quantity (quantities) representative of the dimensions or mass or the weight of the grains or their number per unit area. Furthermore, the yield per unit area (likewise measured and location-specifically detected in the procedure according to FIG. 6 with the impact plate sensor 88) may be displayed and/or used with the aid of the thousand kernel masses to calculate the number of grains per unit area.

By documenting the (thousand) grain mass and/or the grain volume, it is possible to define how and where on the field the yield has been made up. For instance, a given yield may be based on a larger number of smaller grains per area or a smaller number of larger grains per area. In order to cast greater light on this situation, a calculation of the number of grains per area may, for example, be carried out by dividing the likewise location-specifically mapped yield measured in units of mass per area, which may for example be measured by the impact plate sensor 88 known per se in the grain elevator 36, by the mapped (thousand) grain mass, or the grain size or the dimensions of the grains, derived from the image, are used directly as discussed above in order to ascertain the size of the grains.

Using the calculated number of grains per area and/or their dimensions or mass, conclusions may be drawn as to whether possible potential has been lost in the plant cultivation. For instance, few large grains indicate that there is still potential for a higher yield. In this case, the sowing rate could be increased, that is to say more plants per unit area could be cultivated at the relevant site in future. On the other hand, many small grains (shriveled grains) indicate that there is too little water to support the number of plants cultivated per area. In this case, the sowing rate would need to be reduced and/or the water supply and optionally fertilizing would need to be adapted. In order to be able to detect such situations simply, a map in which the thousand kernel mass divided by the number of grains per unit area (or the inverse thereof) is plotted may be displayed. High values of thousand kernel mass divided by the number of grains per unit area would suggest increasing the sowing rate and small values would suggest reducing it. The described detection and mapping of the thousand kernel mass and/or dimensions of the grains and/or number of grains per unit area therefore assist the farmer or agronomist in adapting the plant production measures to varying soils and conditions.

In step 124, a map of the limiting factors may be compiled. This map may location-specifically display sites at which agronomic measures are lacking or may be improved. In particular, insufficient or excess fertilizer may be ascertained with the aid of the protein content, insufficient or excess water with the aid of the grain size, and a sowing rate that is too high or too low with the aid of the thousand kernel mass and the number of grains per area.

Accordingly, in step 126, a new fertilizer or sowing map which is influenced by the conclusions of step 124 is compiled. In this case, with the aid of the displayed data, the farmer or authorized agronomist may establish the sites at which measures are expedient, whether qualitatively or quantitatively. In this case, however, a computer-assisted algorithm may also be employed, which operates in particular with self-learning, that is to say with the aid of previous measures and their measured effect it gradually learns which measures are expedient on the relevant field. The map compiled in the manner described with the measures to be implemented location-specifically is taken into account in step 128 for a subsequent measure, particularly in the subsequent cultivation cycle.

Overall, it may be seen that the location-specifically detected and mapped dimensions of the grains and their likewise location-specifically detected and mapped number per unit area may be ascertained by the proposed arrangement with the aid of the image of the crop, optionally with the addition of the yield values. These two agronomic quantities form an expedient basis for planning the subsequent measures, in particular the sowing rate to be implemented location-specifically. As explained above, these quantities may be ascertained from any desired selection of the following measured and mapped values: yield, dimensions (or mass) of the grains and number of grains per unit area.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the systems, methods, processes, apparatuses and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the systems, apparatuses, devices, methods and/or processes via the use of block diagrams, schematics, flowcharts, examples and/or functional language. Insofar as such block diagrams, schematics, flowcharts, examples and/or functional language contain one or more functions and/or operations, it will be understood by those within the art that each function and/or operation within such block diagrams, schematics, flowcharts, examples or functional language can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the signal bearing medium used to carry out the distribution. Examples of a signal bearing medium include, but are not limited to, the following: a computer readable memory medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components associated with, comprised of, contained within or connected with different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two or more components herein combined to achieve a particular functionality can be seen as "associated with" each other such that the desired functionality is achieved, irrespective of architectures or intermediate components. Likewise, any two or more components so associated can also be viewed as being "operably connected", or "operably coupled", to each other to achieve the desired functionality, and any two or more components capable of being so associated can also be viewed as being "operably couplable", to each other to achieve the desired functionality. Specific examples of operably couplable include, but are not limited to, physically mateable and/or physically interacting components, and/or wirelessly interactable and/or wirelessly interacting components, and/or logically interacting and/or logically interactable components.

Unless specifically stated otherwise or as apparent from the description herein, it is appreciated that throughout the present disclosure, discussions utilizing terms such as "accessing," "aggregating," "analyzing," "applying," "brokering," "calibrating," "checking," "combining," "communicating," "comparing," "conveying," "converting," "correlating," "creating," "defining," "deriving," "detecting," "disabling," "determining," "enabling," "estimating," "filtering," "finding," "generating," "identifying," "incorporating," "initiating," "locating," "modifying," "obtaining," "outputting," "predicting," "receiving," "reporting," "retrieving," "sending," "sensing," "storing," "transforming," "updating," "using," "validating," or the like, or other conjugation forms of these terms and like terms, refer to the actions and processes of a control unit, computer system or computing element (or portion thereof) such as, but not limited to, one or more or some combination of: a visual organizer system, a request generator, an Internet coupled computing device, a computer server, etc. In one example, the control unit, computer system and/or the computing element may manipulate and transform information and/or data represented as physical (electronic) quantities within the control unit, computer system's and/or computing element's processor(s), register(s), and/or memory(ies) into other data similarly represented as physical quantities within the control unit, computer system's and/or computing element's memory(ies), register(s) and/or other such information storage, processing, transmission, and/or display components of the computer system(s), computing element (s) and/or other electronic computing device(s). Under the direction of computer-readable instructions, the control unit, computer system(s) and/or computing element(s) may carry out operations of one or more of the processes, methods and/or functionalities of the present disclosure.

Those skilled in the art will recognize that it is common within the art to implement apparatuses and/or devices and/or processes and/or systems in the fashion(s) set forth herein, and thereafter use engineering and/or business practices to integrate such implemented apparatuses and/or devices and/or processes and/or systems into more comprehensive apparatuses and/or devices and/or processes and/or systems. That is, at least a portion of the apparatuses and/or devices and/or processes and/or systems described herein can be integrated into comprehensive apparatuses and/or devices and/or processes and/or systems via a reasonable amount of experimentation.

Although the present disclosure has been described in terms of specific embodiments and applications, persons skilled in the art can, considering this teaching, generate additional embodiments without exceeding the scope or departing from the spirit of the present disclosure described herein. Accordingly, it is to be understood that the drawings and description in this disclosure are proffered to facilitate comprehension of the present disclosure and should not be construed to limit the scope thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The invention claimed is:

1. A method for measuring grain on a harvesting machine, the method comprising:

acquiring, with a camera, a first image of a first grain and a second image of a second grain harvested during a first harvest operation by the harvesting machine from a first location and a second location, respectively;

processing the first image and the second image with an image processing system;

generating a first output value and a second output value relating to a first dimension of the first grain and a second dimension of the second grain; and determining a sowing rate based on the first output value and the second output value, the sowing rate to be performed in a subsequent cultivation cycle at the first location and the second location before a second harvest operation at the first location and the second location is performed.

2. The method of claim 1, wherein the first output value includes a first mass of the first grain and the second output value includes a second mass of the second grain.

3. The method of claim 2, wherein generating the first output value and the second output value further includes:

determining the first output value and the second output value from a crop flow of the harvesting machine, the crop flow including the first grain and the second grain; and recording the output value with geo-referencing corresponding to the first location of the first grain and the second location of the second grain in a map.

4. The method of claim 3, further including:

measuring at least one constituent of the crop flow; and storing the at least one constituent with the geo-referencing corresponding to the first location and the second location together with the first output value and the second output value in the map.

5. The method of claim 4, further including:

measuring a first yield and a second yield for the first location and the second location; and storing the first yield and the second yield with the geo-referencing corresponding to the first location and the second location together with the output value in the map.

6. The method of claim 5, wherein the map includes a first agronomic measure and a second agronomic measure, the first agronomic measure based on the first dimension of the first grain and the second agronomic measure based on the second dimension of the second grain.

7. The method of claim 1, wherein the sowing rate is a first sowing rate, and sowing rate further includes:

determining the first sowing rate for the first location; and determining a second sowing rate for the second location, wherein the first sowing rate is higher than the second sowing rate based on the first dimension being greater than the second dimension.

8. An apparatus for measuring grain within a crop flow on a harvesting machine, the apparatus comprising:

a camera for acquiring a first image of a first grain and a second image of a second grain harvested during a first harvest operation by the harvesting machine from a first location and a second location, respectively;

an image processing system, wherein the image processing system is configured to generate a first output value and a second output value relating to a first dimension of the first grain and a second dimension of the second grain; and a processor, wherein the processor is configured to execute instructions to determine a sowing rate based on the first output value and the second output value, the sowing rate to be performed in a subsequent cultivation cycle at the first location and the second location before a second harvest operation at the first location and the second location is performed.

9. The apparatus of claim 8, wherein the first output value is a first mass of the first grain and the second output value is a second mass of the second grain.

10. The apparatus of claim 9, wherein the processor is further configured to:

determine the first output value and the second output value from the crop flow of the harvesting machine, the crop flow including the first grain and the second grain; and record the output value with geo-referencing corresponding to the first location of the first grain and the second location of the second grain in a map.

11. The apparatus of claim 10, wherein the processor is further configured to:

measure at least one constituent of the crop flow; and store the at least one constituent with the geo-referencing corresponding to the first location and the second location together with the first output value and the second output value in the map.

12. The apparatus of claim 11, wherein the processor is further configured to:

measure a first yield and a second yield is for the first location and the second location; and store the first yield and the second yield with the geo-referencing corresponding to the first location and the second location together with the output value in the map.

13. The apparatus of claim 12, wherein the map includes a first agronomic measure and a second agronomic measure, the first agronomic measure based on the first dimension of the first grain and the second agronomic measure based on the second dimension of the second grain.

14. The apparatus of claim 8, wherein the sowing rate is a first sowing rate, and wherein, to determine the sowing rate, the processor is further configured to:

determine the first sowing rate for the first location; and determine a second sowing rate for the second location, wherein the first sowing rate is higher than the second sowing rate based on the first dimension being greater than the second dimension.

15. A system for measuring grain on a harvesting machine, the system comprising:

a camera for acquiring a first image of a first grain and a second image of a second grain harvested during a first harvest operation by the harvesting machine from a first location and a second location, respectively;

an image processing system, wherein the image processing system is configured to generate a first output value and a second output value relating to a first dimension of the first grain and a second dimension of the second grain; and one or more processors, wherein the one or more processors are to execute instructions to determine a sowing rate based on the first output value and the second output value, the sowing rate to be performed in a subsequent cultivation cycle at the first location and the second location before a second harvest operation at the first location and the second location is performed.

16. The system of claim 15, wherein the first output value is a first mass of the first grain and the second output value is a second mass of the second grain.

17. The system of claim 16, wherein the one or more processors are further configured to:

determine the first output value and the second output value from a crop flow of the harvesting machine, the crop flow including the first grain and the second grain; and record the output value with geo-referencing corresponding to the first location of the first grain and the second location of the second grain in a map.

18. The system of claim 17, wherein the one or more processors are further configured to:

measure at least one constituent of the crop flow; and store the at least one constituent with the geo-referencing corresponding to the first location and the second location together with the first output value and the second output value in the map.

19. The system of claim 18, wherein the one or more processors are further configured to:

measure a first yield and a second yield for the first location and the second location; and store the first yield and the second yield with the geo-referencing corresponding to the first location and the second location together with the output value in the map.

20. The system of claim 19, wherein the map includes a first agronomic measure and a second agronomic measure, the first agronomic measure based on the first dimension of the first grain and the second agronomic measure based on the second dimension of the second grain.

* * * * *